United States Patent [19]

Flanders et al.

[11] Patent Number: 4,842,044

[45] Date of Patent: Jun. 27, 1989

[54] FURNACE CONTROL SYSTEM

[75] Inventors: Staunton O. Flanders, Highland Park; William A. Ness, Kildeer, both of Ill.

[73] Assignee: Haven Energy, Ltd., Northbrook, Ill.

[21] Appl. No.: 138,310

[22] Filed: Dec. 28, 1987

[51] Int. Cl.[4] .............................................. F25B 29/00
[52] U.S. Cl. ........................................ 165/12; 165/26; 236/11
[58] Field of Search ................ 236/11, 46 R; 62/158, 62/231; 165/12, 26

[56] References Cited

U.S. PATENT DOCUMENTS

| 4,136,730 | 1/1979 | Kinsey | 165/12 |
| 4,369,916 | 1/1983 | Abbey | 236/11 |
| 4,684,060 | 8/1987 | Adams et al. | 236/11 |

Primary Examiner—William E. Wayner
Attorney, Agent, or Firm—Dressler, Goldsmith, Shore, Sutker & Milnamow, Ltd.

[57] ABSTRACT

A control system for a combined heating and cooling system connected to the control circuitry therefor, for energizing a fan or other fluid circulating device to circulate fluid and effect thermal transfer of energy therefrom to the spaces being heated in response to energization of the heating and cooling system, and for deenergizing said circulating means a selected time interval after deenergization of said heating and cooling system to effect extraction of thermal energy from the circulating fluid, said control system being operative in the absence of electrical energy or other malfunction to energize fluid circulating device.

11 Claims, 1 Drawing Sheet

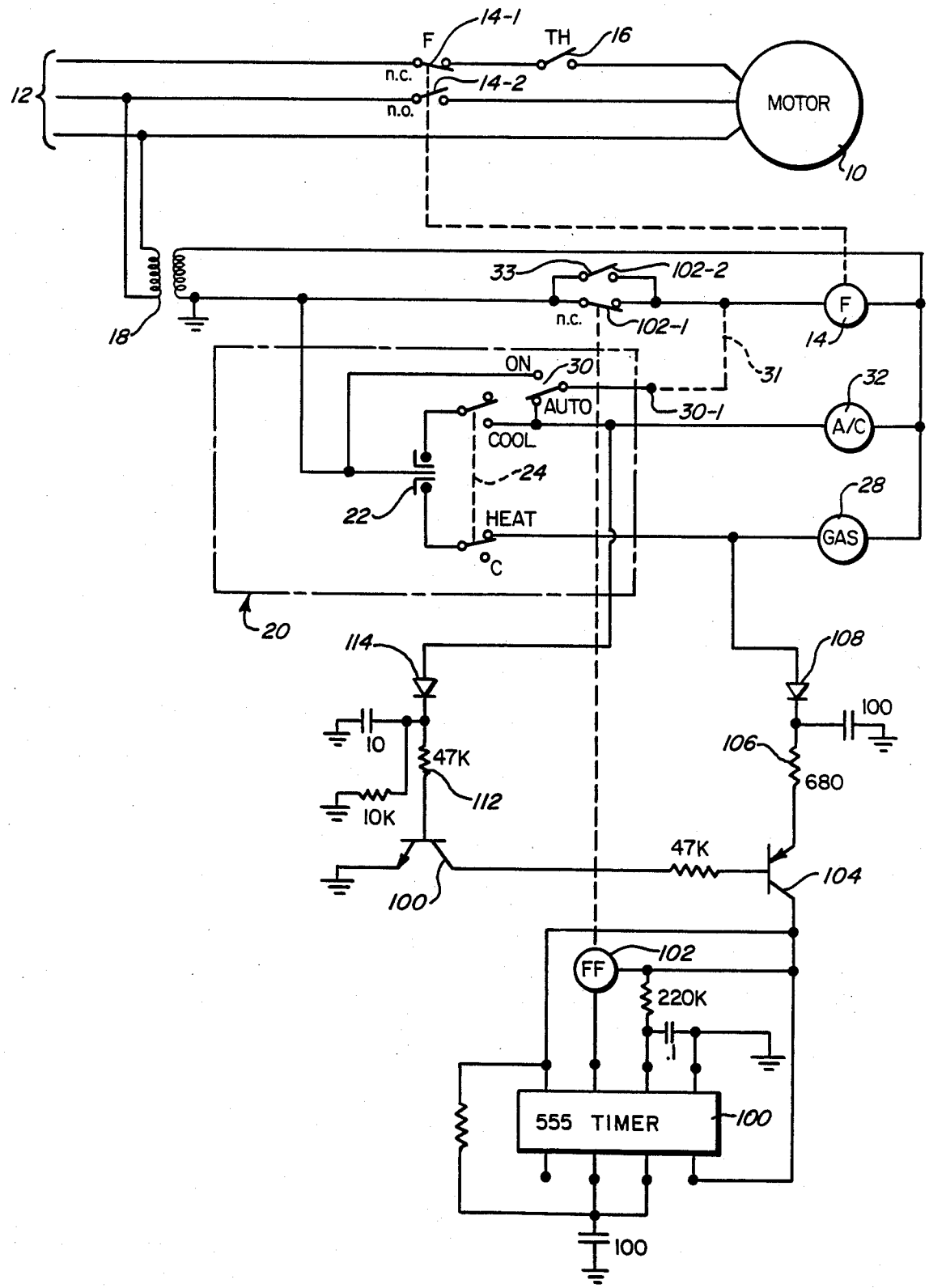

FURNACE CONTROL SYSTEM

FIELD OF THE INVENTION

The present invention relates generally to a heating and cooling system control and, in particular, to a control system for improving fuel utilization and efficiency of heating and cooling systems, including existing and new systems.

BACKGROUND OF THE INVENTION

Heating and cooling of internal spaces of residences and small commercial structures have not always been achieved at maximized fuel efficiency. It is well-known that there are a number of factors which contribute to the loss of fuel efficiency and waste of energy.

For example, in many forced air heating systems, with and without air conditioning, a substantial amount of energy is wasted heating the combustion chamber and surrounding furnace cabinet each time the heating cycle is initiated and combustion commenced. There must, of course, be an exhaust for combustion products and, therefore, a certain amount of heat energy is necessarily lost through the stack. However, only a portion of the losses that occur in many installations is necessary to facilitate exhaust of combustion products.

Various techniques have been attempted to reduce losses. Flue dampers, for example, raise safety concerns, since combustion exhaust products may not be properly exhausted if the flue damper operates improperly. The result could be dangerous if exhaust products enter the structure being heated. Flue dampers, of course, are designed to be open when the furnace is being operated and, therefore, are not designed to alter the operational characteristics of the furnace, but only reduce stack losses in the absence of combustion and when the furnace is not being operated.

The operational characteristics of the furnaces themselves also do not maximize energy efficiencies. Typical operational cycles of heating and cooling systems fail to fully consider what can be done to increase the efficiencies and reduce undesirable losses. A major source of heat loss occurs through what is commonly referred to as "stand-by losses". In forced air systems, many stand-by losses occur because of the nature of the operational cycle normally used. For example, when a thermostat senses that heat is required, a burner is operated to produce combustion in a combustion chamber. Heat is produced not only in the combustion chamber, but in a heat exchanger over which the forced air flows to carry heat from the furnace into the spaces to be heated. The air returns from these spaces to be reheated in the furnace.

In typical operation of forced air and many other furnaces, air circulation does not commence until the air adjacent the heat exchanger is heated to a selected temperature. As a result, stack temperatures and temperatures within the heat exchanger rise rapidly to a level far beyond that which is needed for combustion gas exhaust. It should be understood that some heating of the stack is required in order to produce the desired exhaust effect, as is well-known. However, when excess heat is produced prior to initiation of the forced air circulation, the excess heat is lost up the stack.

In standard furnace operation, a thermal sensor in the air plenum adjacent to and downstream of the heat exchanger is used to effect energization of the circulating fan to initiate air circulation when the temperature of the air in the air plenum reaches a pre-selected value. However, since the air is not circulated initially, it takes longer to heat the stationary air in the plenum than it would to heat air flowing across the heat exchanger. The efficiency of the heat exchanger, which is designed to transfer heat to moving air in contact therewith, is substantially reduced when the air is not circulating.

Thereafter, when the thermostat senses that the desired temperature in the space being heated has been achieved, the control circuit to operate the burner is deenergized and combustion is terminated. The fan continues to circulate air until the temperature sensor in the downstream air plenum senses a drop in the temperature of the air to a second pre-selected value below the value at which circulation was commenced, at which time the fan is shut down. In typical systems, the shut-down temperature differential may be 20° below the temperature at which operation of the fan was commenced.

Even though air circulation is terminated as a result of the temperature of the circulating air
recognized reaching the shut-down value, it should be that at the typical shut-down temperature of 120° F., there is still considerable heat left in the circulating air, in the combustion chamber, and in the heat exchanger. Since the air is no longer circulating through the structure being heated, this residual heat energy is lost up the stack and through case transfer into the immediate space, rather than being utilized to heat circulating air and the spaces being heated thereby. These inefficiencies reoccur each and every time the furnace cycles on and off.

Furthermore, many furnaces are oversized in order to ensure adequate capacity. They, therefore, tend to cycle more often for short periods of time. Contrary to the usual belief, short cycling aggravates and increases the energy losses and inefficiencies. Multiple short cycling of the furnace tends to cause oscillation of the temperature in the spaces being heated. This type of variation in the air temperature results in a lower comfort level than a steady state temperature. As a result, the thermostat is often set at a higher value than might be the case if a more constant temperature were maintained, requiring unnecessary utilization of fuel to maintain the higher thermostat set point temperature in the spaces being heated.

While hot water systems are somewhat different, they also incorporate operating heat losses and inefficiencies. Existing hot water heaters, particularly for small structures such as residences, also have high-stack and/or stand-by losses. In one type of hot water system in which a circulating water pump and the burner are energized and deenergized simultaneously, the residual heat in the water when the burner and pump are shut down is lost due to the lack of circulation and is transferred up the stack.

Thus, normally, the fan or circulator is energized when the temperature in the plenum reaches a selected value and is deenergized when the temperature sensed at that point reaches a second lower value. This hysteresis, i.e., the energizing of the fan or circulator at one temperature value and the deenergization of the fan or circulator at a different, lower value, is necessary in order to avoid frequent and rapid cycling of the fan or circulator as a function of small temperature differences.

In addition, in order to minimize the possibility of the fan or circulator being inadvertently energized independently of operation of the heating system itself, e.g., inadvertent operation at high ambient temperatures that might occur, for example, in the summer, the temperature at which the fan is turned on must be selected to be sufficiently high so that the fan will not be energized in response to hot ambient temperatures. As a result, the fan energization is delayed for a significant period of time after the heating system is energized, which precludes early efficient transfer of the heat energy being produced in the heating system to the fluid to be circulated and results, as described above, in undesirable losses.

Thermal hysteresis is provided because, otherwise, a fan might be deenergized shortly after the heating system was deenergized. As a result of the build-up of unused heat in the furnace thereafter, the fan might cycle on and off until the heat was dissipated from the heating system. For this reason, the temperature differential between the turn on and turn off values is usually at least 20°, and sometimes more. This allows the fan to continue to operate for a period of time after the heating system itself is deenergized so that it will not be restarted due to thermal conditions within the furnace system. The temperature at which the fan is turned on is normally set sufficiently high, typically in the neighborhood of 110° or 120°, to preclude the fan from operating inadvertently during hot weather conditions.

Systems that operate under direct control of thermostats turn on when the thermostat initiates operation of the furnace and turn off when the thermostat opens a circuit to the furnace to deenergize the burner or heating system. No consideration in such systems is provided for extraction of maximum heat from the system at the end of the heating cycle.

Typical air conditioning (i.e., cooling) systems operate in this manner. In these systems, the air circulation and the compressor are energized and deenergized simultaneously. Upon deenergization, there is still a substantial amount of cooling capability left in the cooling system and in the circulating air, which could be extracted and used, thereby reducing the number of cycles of the cooling system.

Heating and cooling efficiencies could be improved if circulation of fluids, such as air in a forced air system, could be controlled to increase extraction of the thermal energy therefrom, whether for heating or cooling. One of the benefits from this approach should be to reduce the number of cycles and the inefficiencies resulting from, and occurring during, the initiation and ending of each cycle by extending the length of the cycle and extracting available energy from the circulating fluids, such as forced air.

BACKGROUND ART

Bonne, et al. U.S. Pat. No. 4,090,663 discloses a system for energizing the furnace when the temperature differential between two points achieves a first value, and for deenergizing the circulation of the air when the temperature differential achieves a second, substantially smaller, value. In the Bonne system, a hysteresis is required. Thus, different values of temperature differential is used to turn the fan on and to shut the fan down. In addition, modifications to the furnace circuitry itself is required to achieve operation in accordance with the teachings of Bonne, et al. The operation of the Bonne system produces energy savings which are at least partially illusory. Thermal difference operation for startup and shutdown with the necessary hysteresis provides minimal additional savings over the standard operation and, even then, only when a night set-back is utilized. If the Bonne thermostat is set at a higher value, then the suggested temperature differences between that ambient temperature and the heated air would result n fan energization at higher temperatures than normal, and would result in a temperature shut down at higher temperatures than normal. At both ends of the cycle, therefore, there would be a decrease in operating efficiencies and an increase in energy wasted.

Abbey U.S. Pat. No. 4,369,916 discloses an override blower control device adapted to be connected in a furnace for altering the operation of the furnace blower. According to the Abbey patent, a pair of override relays are connected respectively across the air conditioner relay and the burner or gas valve relay. During heating, when the gas valve is energized, or during cooling, when the air conditioner relay is energized, a time delay relay is operated to cause various blowers to function at the start of the compressor or burner cycle and continue that function until the timed interval of the relay is complete. The method of connecting the circuit in the Abbey patent to the furnace is unclear, but, apparently, the two override relays are connected directly across the compressor relay and burner relay, and the time relay is connected across the blower control to complete the circuit to the blower and effect energization thereof.

It is apparent that the circuitry disclosed in Abbey must be connected at the furnace in the 110 volt A.C. circuitry. Problems of safety resulting from improper operation of the furnace and from the Abbey circuitry malfunctioning is not disclosed and is unclear.

It would be desirable, therefore, to provide a furnace control system which would ensure operation of the fan upon initiation of the heating and/or cooling cycles, and would allow for deferred deenergization of the blower at the end of the cycle when the burner or compressor is deenergized. Such a system would simultaneously provide the necessary safety functions in the event of malfunctioning of the control circuitry to ensure absolute safety of the operation of the furnace and air conditioning circuitry.

Such a control system, achieved readily and easily, useful with existing systems, and capable of installation by the homeowner without extensive modification of the components of the heating and cooling system while providing the desired benefits, could be desirable.

SUMMARY OF THE INVENTION

In accordance with the present invention, there is provided a control system for improving operating efficiencies of furnaces and similar heating and cooling systems and for reducing the energy losses, which can be achieved at reasonable cos without modification to existing installed systems while maintaining all of the safety requirements of existing systems.

The furnace control system incorporating the present invention is easily installed, is safe in that it does not require connection to high voltage circuitry, does not require installation on the furnace, but can be installed in the vicinity of the thermostat and operated by the six or twelve volt control voltages normally present at the thermostat, requires no modification of the furnace and air condtioners themselves, requires no changes or connections to the circuitry of the furnace, particularly to the high voltage circuitry that may be utilized, and ensures safe operation of the blower in the event of malfunction.

More specifically, the control circuitry incorporating the present invention is adapted to be connected to the thermostat and mounted adjacent thereto, and incorporates an electronic switching circuitry responsive to operation of the thermostat to control blower operation in accordance with a selected pattern. The control circuitry in accordance with the present invention is further constructed so that in the absence of power applied thereto, or upon failure of the control circuitry, the blower is energized to preclude operation of either the compressor or the furnace without operating the fan. In addition, since the control circuitry incorporated in the present invention is not connected to the furnace directly, or to any of the switches or safety contacts or sensors contained in the furnace, no modification or change in the operation of those safety circuits occurs.

Furthermore, the control circuitry incorporating the present invention is capable of being connected to effectuate its control directly through the thermostat without requiring access or extensive modification to the furnace circuitry itself.

Thus, the control circuitry in accordance with the present invention is easily installed, with little, if any, modification to the furnace control system itself, is designed to achieve safety by ensuring operation of the fan in the event of any failure to the control circuitry, thereby providing a fail-safe operation, and otherwise provides the desired increase in efficiencies by achieving instantaneous operation of the fan upon energization of the burner (heating element) and/or the air conditioning compressor and by maintaining the fan energized for a period of time after the heater or cooling system has been deenergized to extract a high degree of available thermal energy therefrom and effectuate the desired heating or cooling at increased efficiency and lower cost with considerable ease of installation.

Numerous other advantages and features of the present invention will become readily apparent from the following detailed description of the invention and the embodiments thereof, from the claims, and from the accompanying drawings in which the details of the invention are fully and completely disclosed as a part of this specification.

BRIEF DESCRIPTION OF THE DRAWING

The single FIGURE of the drawing is a schematic diagram showing the control system of the present invention connected to a thermostat for controlling the operation of a heating/cooling system.

DESCRIPTION OF SPECIFIC EMBODIMENT

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

The drawing shows various components utilized in conjunction with a forced air heating and cooling system, including a fluid circulating device, e.g., fan or blower motor 10, connected to an A.C. source of A.C. energy 12. The blower operated by motor 10 is designed to circulate fluids, such as air, over one or more heat exchangers of a furnace/air conditioner for effectuating either heating or cooling of the circulating fluid and the resulting heating or cooling of the space through which the fluid is being circulated. For example, air to be heated is forced over a heat exchanger, and the heated air leaves a hot air plenum and enters ductwork to the spaces being heated/cooled. The air returns from the spaces through a return duct and is circulated once again over the heat exchanger for repetition of the air circulation cycle.

The fan motor 10 is connected to the electrical source 12 through a pair of fan relay contacts 14-1, 14-2, the operation of which is controlled by a fan relay 14. In series with the normally closed fan relay contacts 14-1 is a thermal switch 16 which, in the normal operation of a furnace, i.e., in the absence of the control circuit incorporating the present invention, closes when the temperature in the air plenum reaches a selected value and opens when the air in the plenum is cooled to a second value substantially lower than the first value. In the normal operation of a furnace, the temperatures at which the thermal switch 16 closes are typically set at 110°–120°, and the temperature at which the thermal switch 16 reopens to deenergize the fan motor 10 occurs at temperatures some 20° lower.

Also connected to the source 12 is a step-down transformer 18, which provides control voltage to a thermostat 20. The thermostat has a temperature responsive switch 22 which closes, for example, in the heating position when the temperature in the space being monitored by the thermostat drops to a pre-selected value as determined by the thermostat setting. When the thermostat temperature switch 22 closes and the thermostat selection switch 24 is in the heating position, as shown in the drawing, a circuit is completed through a gas valve solenoid 28 to initiate operation of a burner to heat the air in the vicinity of the heat exchanger.

Thus, in normal operation, when the heat/cool selection switch 24 is in the position shown, the normally closed contacts 14-1 of fan relay are connected in series with the thermal switch 16 to allow energization of the fan motor 10 when the temperature in the plenum reaches a selected value, causing switch 16 to close. Subsequently, when the temperature in the plenum drops to the second lower value, the thermal switch 16 opens to deenergize the fan motor 10.

On the other hand, when thermostat selection switch 24 is in the air conditioning or cool position, in normal operation the contact 30-1 of the auto/on switch 30 would be connected to the fan relay 14 as shown by the phantom line 31. Thus, when the thermostat switch 22 closes to energize the air conditioning solenoid 32, the fan relay 14 would be energized to close the normally open contacts 14-2 connected to the fan motor 10 and open the normally closed 14-1 to achieve instantaneous operation of the fan motor 10 when the air conditioner solenoid 32 is energized.

When the temperature reaches a second lower value, and the contacts of thermostat switch 22 open to deenergize the air conditioning solenoid 32, the fan relay 14 would be simultaneously deenergized to open the contacts 14-2 connected to the fan motor 10 and deenergize the motor. The normally closed contacts 14-1 close, but the open thermal switch 16 prevents the fan motor from being energized.

The auto/on fan switch 30 also enables the user to override automatic thermostat control of the fan. Contact 30-1 of the auto/on switch 30 is normally connected to fan relay 14 by phantom line 31. Fan motor 10 is energized when the auto/on switch 30 is in the "on" position. However, in accordance with the preferred embodiment of the present invention, contact 30-1 of switch 30 is not connected to fan relay 14. Instead, manual override control of the fan motor 10 is accomplished by switch 33 connected in parallel with contacts 102-1. Contacts 102-1 are normally closed and controlled by fan control relay 102, as more fully described below.

The control circuit in accordance with the present invention includes a delay timer circuit 100 having its output connected in series with a fan control relay 102. When a supply voltage is applied to the timer 100, the control relay 102 is energized after a time delay determined by the values of the components connected to the timer 100. When the fan control relay 102 is energized, the normally closed contacts 102-1 in series with the fan relay 14 open to deenergize the relay 14 and the fan motor 10.

The supply voltage is supplied to the timing circuit through control transistor 104, the emitter of which is connected to one side of the gas solenoid 28 through a resistor 106 and a diode 108. The base of transistor 104 is connected t normally bias control transistor 110 conductive by virtue of the base of control transistor 110 being connected to the air conditioner solenoid 32 through resistor 112 and diode 114.

In the standby condition with power applied to the circuit, but with the thermostat switches open and neither the heating or cooling taking place, a supply voltage is applied from the step-down transformer 18 through the gas solenoid 28, diode 108, and resistor 106, and through control transistor 104, which is bias conducting by biasing transistor 110 to provide a supply voltage to the timer to cause it to energize the fan control relay 102 and maintain the normally closed contacts 102-1 open.

During heating, when the thermostat switch 22 closes to energize the gas solenoid 28, the increased current causes a voltage drop across resistor 106 and the supply voltage to the timer 100 drops sufficiently to effectuate deenergization of the fan control relay 102, with the resulting closure of contacts 102-1 in series with the fan relay 14. The fan relay is thus energized causing the contacts 14-2 to close and energizing the fan motor 10.

When the thermostat set temperature has been reached, switch 22 opens, and gas valve 28 is deenergized. The supply voltage is thus applied through the heating control transistor 104 to the timer 100 to begin its time-out operation. When the timer 100 times out, the fan control relay 102 is energized to open its contacts 102-1 and deenergize the fan relay 14 and thereby the fan motor 10. This operation does not disable the normal thermal protection. When the fan relay 14 is deenergized, if by chance the temperature in the plenum is still too high, the closing of the normally closed relay contacts 14-1 in series with the thermal switch 16 will result in reenergizing of the fan motor 10 for as long as switch 16 is closed.

During cooling, when the thermostat switch closes to energize the air conditioning relay 32, the bias transistor 110 is turned off, which, in turn, turns the control transistor 104 off. As a result, the supply voltage to the timer 100 is interrupted, allowing the fan control relay 102 to deenergize and the normally closed contacts 102-1 to close. The fan turns on.

Upon deenergizing the air conditioning, the bias transistor 110 is turned on to cause the control transistor 104 to conduct. This applies the supply voltage to the timer 100 to initiate the timing operation. The fan control relay 102 is energized after the predetermined time delay to open the normally closed contacts 102-1 in series with the fan relay 14 to deenergize the fan motor 10.

As can be appreciated, if the timer 100 malfunctions, or the signal through the fan control relay 102 is interrupted in any fashion, the relay 102 is deenergized, allowing the normally closed contacts 102-1 in series with the fan relay 14 to close and energize the fan motor 10 to ensure that the fan operates. Thus, the control system provides additional safety to ensure operation of the fan motor in the event of malfunctioning of the control circuit. Normally, the control system initiates operation of the fan instantaneously with energizing of the fuel valve or air conditioning compressor and maintains the fan energized after deenergizing of the burner or air conditioner for a period of time sufficient to extract a substantial portion of the thermal energy remaining in the circulating fluid, e.g., air, to be transferred into the spaces being heated or cooled.

Thus, there has been disclosed a simple, low cost, low voltage control system adapted to be attached to a thermostat without substantial modification thereof, and which provides for the control of the circulating fan in a manner to increase the efficiency of the fan and fuel utilization, while simultaneously avoiding high voltage and modification to the wiring at the furnace. A simple connection to the thermostat allows for easy installation by a homeowner of a circuit having no exposure to high voltage, with resulting safety and reliability of operation.

Further, in accordance with the present invention, the control system ensures operation of the fan blower in the event of any malfunction and requires energization in order to interrupt the fan operation. Thus, upon a loss of power to the control circuit, the fan is automatically energized. Not only does this provide for increased safety in the event of malfunction, but operates to signal the possible existence of a malfunction by the fact that the fan operates, and continues to operate, in spite of the thermostat not calling for heating or cooling, as the case may be.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a combined heating and cooling system of the type which is selectively energized to heat and cool a building space by transferring thermal energy to a fluid and by energizing fluid circulating means to circulate the fluid through the building space, a control system comprising:

switching means normally connected to effect energization of said fluid circulating means;

switching control means energizable in response to deenergization of said heating and cooling system for operating said switching means to inhibit energization of said fluid circulating means;

said switching control means being deenergized for operating said switching means to effect substantially immediate energization of the fluid circulating means in response to energization of said heating and cooling system; and circuit means responsive to the deenergization of said heating and cooling system for energizing said switching control means a selected time interval after deenergization of said heating and cooling system to operate said switching means and deenergize said fluid circulating means.

2. A control system as claimed in claim 1, wherein:
said circuit means is responsive to the energization of said heating and cooling system for effecting deenergization of said switching control means.

3. A control system as claimed in claim 1, wherein:
the combined heating and cooling system includes electrically operated system control means connected to an electrical power source and operable to effect energization of the heating and cooling system; and wherein:
said circuit means is connected to said power source through said electrically operated system control means for normally effecting energization of said switching control means to operate said switching means and inhibit energization of said fluid circulating means, said circuit means being responsive to energization of said electrically operated system control means for effecting deenergization of said switching control means to effect said energization of said fluid circulating means.

4. A control system as claimed in claim 3, wherein said circuit means is operable in response to disconnection thereof from said electrical power source for effecting deenergization of said switching control means to effect said energization of said fluid circulating means.

5. A control system as claimed in claim 3, wherein said electrically operated system control means comprises heating system control means for effecting energization of the heating and cooling system to heat the fluid to be circulated, and cooling system control means for effecting energization of the heating and cooling system to cool the fluid to be circulated; and wherein:
said circuit means is connected to said power source through both said electrically operated heating system control means and said electrically operated cooling system control means and is responsive to energization of either of said electrically operated system control means for effecting deenergization of said switching control means and said resultant energization of said fluid circulating means.

6. A control system as claimed in claim 5, wherein said circuit means includes timing means and first normally closed timing switch means connecting said timing means to said electrically operated heating system control-means.

7. A control system as claimed in claim 6, wherein said circuit means further includes second normally closed timing control switch means connected to said electrically operated cooling system control means for normally maintaining said first timing switch means closed in response to deenergization of said electrically operated cooling system control means, and for opening said first timing switch means in response to energization of said electrically operated cooling system control means for effecting deenergization of said switching control means and the resulting energization of said fluid circulating means.

8. In a heating system of the type which has a control circuit that is operable to energize the heating systems to heat a building space by the system heating a fluid to be circulated through the building space by fluid circulating means in response to closure of a thermomtatic switch located in the building space when the temperature in the space drops to a first selected value and in which said control circuit is operable to deenergize the system in response to opening of said thermostatic switch when the temperature is the space rises to a second selected value, a control system comprising;

switching means normally connecting said circulating means to said control circuit to effect energization of said fluid circulating means when power is applied to the control circuit;

switching control means energizable in response to operation of the control circuit to deenergize said heating system for operating said switching means to disconnect said fluid circulating means from said control circuit to inhibit energization thereof;

said switching control means being deenergized in response to energization of said heating system to operate said switching means to connect said fluid circulating means to said control circuit; and additional circuit means responsive to the deenergization of said heating system for energizing said switching control means a selected time interval after deenergization of said heating system to operate said switching means and disconnect said fluid circulating means from said control circuit.

9. A control system as claimed in claim 8, wherein:
said heating system control circuit includes electrically operated heating control means connected to an electrical power source through said thermostatic switch, said heating control means operable to effect energization of the heating system in response to closure of said thermostatic switch; and wherein:
said additional circuit means is connected to said power source through said electrically operated heating control means for normally effecting energization of said switching control means to operate said switching means and inhibit energization of said fluid circulating means.

10. A control system as claimed in claim 8, wherein:
said additional circuit means is responsive to energization of said electrically operated heating control means to effect deenergization of said switching control means and operation of said switching means to connect said fluid circulating means to said control circuit means and effect energization of said fluid circulating means.

11. A control system as claimed in claim 8, wherein said additional circuit means is operable in response to disconnection thereof from said control circuit for effecting deenergization of said switching control means to effect said energization of said fluid circulating means.

* * * * *